United States Patent [19]

Hammond et al.

[11] Patent Number: 5,543,122
[45] Date of Patent: Aug. 6, 1996

[54] PROCESS FOR THE REMOVAL OF $H_2S$ FROM NON-CONDENSIBLE GAS STREAMS AND FROM STEAM

[75] Inventors: Charles A. Hammond, Lake Jackson; Shelby P. Oostwouder, Houston; Robert A. Lanning, The Woodlands, all of Tex.

[73] Assignee: The Dow Chemical Company, Midland, Mich.

[21] Appl. No.: 336,439

[22] Filed: Nov. 9, 1994

[51] Int. Cl.$^6$ ................................................. B01D 53/52
[52] U.S. Cl. ........................ 423/220; 423/224; 423/226; 423/242.1; 423/242.2; 423/573.1; 423/576.5; 423/576.6; 423/576.8; 423/DIG. 19; 423/514
[58] Field of Search ................................. 423/220, 224, 423/226, 242.1, 242.2, 573.1, 576.5, 576.6, 576.8, DIG. 19, 514

[56] References Cited

U.S. PATENT DOCUMENTS

| | | | |
|---|---|---|---|
| 3,933,993 | 1/1976 | Salemme | 423/573 |
| 4,009,251 | 2/1977 | Meuly | 423/573 G |
| 4,088,743 | 5/1978 | Hass et al. | 423/539 |
| 4,414,817 | 11/1983 | Jernigan | 60/641.2 |
| 4,451,442 | 5/1984 | Jeffrey et al. | 423/224 |
| 4,468,929 | 9/1984 | Jernigan | 60/641.2 |
| 4,528,817 | 7/1985 | Jernigan | 60/641.2 |
| 4,622,212 | 11/1986 | McManus et al. | 423/226 |
| 4,629,608 | 12/1986 | Lampton, Jr., et al. | 423/226 |
| 4,705,676 | 11/1987 | Fong et al. | 423/567 A |
| 4,774,071 | 9/1988 | Jeffrey et al. | 423/573 R |
| 4,816,238 | 3/1989 | Jeffrey | 423/226 |
| 4,830,838 | 5/1989 | Kent et al. | 423/226 |
| 4,834,959 | 5/1989 | Kent et al. | 423/242 |
| 4,960,575 | 10/1990 | Bedell et al. | 423/222 |
| 4,967,559 | 11/1990 | Johnston | 60/641.2 |
| 5,223,173 | 6/1993 | Jeffrey | 252/191 |

FOREIGN PATENT DOCUMENTS

| | | |
|---|---|---|
| 605764 | 1/1985 | Australia. |
| 1180536 | 1/1985 | Canada. |
| 1288087 | 8/1991 | Canada. |

OTHER PUBLICATIONS

2 sheets—Brochure relating to GAS/SPEC RT-2 process description.

Primary Examiner—Gary P. Straub
Assistant Examiner—Timothy C. Vanoy

[57] ABSTRACT

A process for treating non-condensible gas streams containing $H_2S$, and for treating steam containing $H_2S$, is disclosed, the process being characterized by unique division of the noncondensible stream, or of a separated non-condensible $H_2S$-containing stream derived from the steam, with diverse oxidative treatment of the separated portions. The invention is particularly suited to treating the exhaust steam from a steam turbine which utilizes geothermal steam as the working fluid. In a preferred aspect, disposal of sulfur produced as normal byproduct of liquid oxidative steps may be reduced or avoided altogether by reaction of the sulfur with bisulfite and/or sulfite produced in the procedure to produce soluble thiosulfate.

20 Claims, 3 Drawing Sheets

PROCESS FOR THE REMOVAL OF H$_2$S FROM NON-CONDENSIBLE GAS STREAMS AND FROM STEAM

FIELD OF THE INVENTION

The invention relates to the processing of gas streams containing H$_2$S to remove the H$_2$S, and, in preferred aspects, the processing of gas streams comprising steam and H$_2$S to condense steam and remove the H$_2$S. The invention is particularly suited to treating H$_2$S-containing steam from the exhaust of a steam turbine, especially the exhaust steam from a turbine utilizing geothermal steam as the working fluid.

BACKGROUND OF THE INVENTION

Industrial and natural sources produce a wide variety of gas streams containing significant amounts or concentrations of H$_2$S. In some instances, the gas streams will also contain or be composed principally of steam, with H$_2$S and other non-condensible gaseous materials being present as contaminants. Geothermal steam, for example, comprises or is composed of steam with varying minor concentrations or amounts of non-condensible gases such as H$_2$S, CO$_2$, CH$_4$, NH$_3$, H$_2$, and N$_2$.

While processing equipment which uses or disposes of such gases is commonly constructed of special materials which resist the corrosive character of H$_2$S, downstream usage or requirements may require the removal of the H$_2$S. For example, H$_2$S interferes with many chemical reactions and cannot be tolerated in a reactant gas. Again, even if tolerated in some operations, the H$_2$S-containing gas cannot be exhausted to the environment. For example, boiler exhaust gases containing significant quantities of H$_2$S must be treated before being sent to stack. In the case of geothermal steam usage, before the condensate derived from the spent steam can be processed for disposal, H$_2$S in the condensate must be eliminated.

A variety of procedures have been employed to treat or purify H$_2$S-contaminated gases. In some instances, if the stream comprises principally non-condensible materials, e.g., those mentioned, supra, with a significant concentration of H$_2$S, say 200 ppm by volume or more, the stream may be incinerated to produce SO$_2$ from the H$_2$S. In such cases the SO$_2$ may then be removed from the non-condensible stream by scrubbing, the remaining non-condensibles being vented or further processed. Where the non-condensible gases contain lesser quantities of H$_2$S, aqueous reactant systems which comprise regenerable reactants which react with the H$_2$S to produce solid free sulfur are preferable. Suitable reactants include polyvalent metal ions, such as iron, vanadium, copper, manganese, and nickel, and include polyvalent metal chelates. Preferred reactants are coordination complexes in which the polyvalent metals form chelates with specified organic acids.

Where the sour or H$_2$S-containing gas comprises or is composed principally of steam, steam condensation must be taken into account in any removal procedure. Thus, in one preferred system in use for exhaust geothermal steam, the exhaust steam is condensed in a combination condensation-H$_2$S removal zone, with removal of H$_2$S from the steam and/or condensate by an aqueous oxidizing iron chelate solution. Solubility of the H$_2$S in the condensate or combination condensate/chelate solution is determined largely by the type of condensation employed and, if direct contact of the steam with aqueous iron chelate solution is practiced, by pH of the aqueous oxidizing iron chelate solution. In general, the condensation of the steam is carried out under conditions such that the volume of H$_2$S dissolved is less than fifty percent by weight of the H$_2$S in the steam. The dissolved H$_2$S reacts with the Fe$^{+++}$ chelate to form particulate sulfur, the H$_2$S remaining as a non-condensible gas being thermally incinerated to SO$_2$. The SO$_2$ is further treated with alkaline solution to convert the SO$_2$ to easily disposable or further usable HSO$_3^-$ and/or SO$_3^{-2}$ ions in solution. The process further features regeneration of the derivative Fe$^{++}$ chelate in the condensate/chelate solution to Fe$^{+++}$ chelate, and, importantly, utilizes sulfur from the condensate and other byproducts of the process to generate thiosulfate ion in solution, the latter being easily and safely disposed of without environmental contamination.

While the prior art schemes have many advantages, they still admit of improvement. For example, if the H$_2$S-containing gas contains a large proportion of H$_2$S, or if H$_2$S is partitioned increasingly, e.g., up to 95 percent or so by weight of the stream, to the incineration reactor, increased energy and chemical (alkaline solution) costs will be incurred. The invention, therefore, is directed to providing a more cost efficient approach to processing high H$_2$S content streams or to increasing the volume of the split of non-condensible contaminant H$_S$ from steam condensation processes.

SUMMARY OF THE INVENTION

Accordingly, the invention relates to the removal of H$_2$S from sour gas streams, the removal of H$_2$S from sour gas streams comprising or composed principally of steam being a preferred aspect of the invention. In the case of non-condensible streams containing large concentrations of H$_2$S, reduction of byproducts is accomplished in an integrated scheme which returns important values to the process. Accordingly, in one embodiment, the invention relates to a process for removing H$_2$S from a non-condensible gas stream containing H$_2$S and other non-condensible gases comprising dividing or partitioning the non-condensible gas stream into a first H$_2$S-containing stream containing the bulk of the H$_2$S in the gas stream (i.e., greater than fifty percent by weight), and a second H$_2$S-containing stream containing a minor portion of the H$_2$S in the non-condensible gas stream; oxidizing the H$_2$S in the first H$_2$S-containing stream in a thermal oxidation zone to produce a gaseous stream comprising SO$_2$, and removing the SO$_2$ from the gaseous stream by contacting said gaseous stream with an alkaline solution in a scrubbing zone with an alkaline solution under conditions to produce a purified gas stream and a scrubbing zone solution containing bisulfite and/or sulfite ions; concurrently contacting the second H$_2$S-containing stream with an aqueous solution of ferric chelate in an aqueous liquid oxidation zone under conditions to convert H$_2$S in said second H$_2$S-containing stream to sulfur in said solution, producing a purified residual gas stream, and removing sulfur from said aqueous liquid oxidation zone. Further according to this embodiment, the scrubbing zone solution containing sulfite is combined with sulfur from the aqueous liquid oxidation zone in a blending zone under conditions to convert sulfur and produce a solution containing thiosulfate ion and residual bisulfite and/or sulfite ions. As used herein, the term "and/or", as applied in indicating the ions in solution derived from the reaction of alkaline solution with SO$_2$, is understood to include three possibilities, i.e., all or substantially all bisulfite ions, bisulfite and sulfite ions, or all or substantially all sulfite ions.

In a second embodiment, the invention relates to a process for condensing steam containing a minor concentration or amount of $H_2S$ and other non-condensible gases. The process provides for effective aqueous ferric chelate solution conversion of $H_2S$ which dissolves in the condensate or in the treating solution in the condensation zone, while simultaneously partitioning a major portion of the $H_2S$ from the condensation zone as a non-condensible gas stream, with efficient and cost effective disposition of the $H_2S$ in the stream. Reduction of the amount of sulfur produced in the combined condensate-aqueous iron chelate liquid, because a greater portion of $H_2S$ is apportioned to the non-condensible gas stream, allows for improved management of sulfur in the cooling and regeneration section associated with the condensation-removal zone.

To this end, efficient removal of the $H_2S$ in the non-condensible stream is accomplished by further separation or division of this $H_2S$-containing stream, and effective treatment of the divided streams, as described more fully hereinafter. That is, the $H_2S$-containing stream from the condensation zone is divided into a first or primary $H_2S$-containing portion or stream which is subjected to thermal oxidation and treatment of the $SO_2$-containing stream produced, and a second minor portion or stream from which the $H_2S$ is concurrently oxidized to elemental sulfur by an aqueous ferric chelate solution. The utilization of an aqueous ferric chelate solution system for $H_2S$ removal from the second portion allows for reduced incineration and caustic scrubbing costs, as well as producing byproduct sulfur which is easily recovered or employed with further advantage, as outlined in preferred embodiments of the invention described more fully hereinafter.

More particularly, in this embodiment, the invention relates to a process comprising condensing steam containing a minor amount of $H_2S$ and other non-condensible gases in a condensation zone and removing $H_2S$ from the steam and condensate by direct contact thereof with an aqueous solution containing ferric chelate under conditions to convert $H_2S$ to sulfur, and ferric chelate to ferrous chelate, leaving a non-condensible gas stream containing the bulk of the $H_2S$ in the steam; dividing or partitioning said non-condensible gas stream into a first $H_2S$-containing stream containing the bulk of the $H_2S$ in said gas stream and a second $H_2S$-containing stream containing a minor portion of the $H_2S$ in the non-condensible gas stream; oxidizing the $H_2S$ in the first $H_2S$-containing stream in a thermal oxidation zone to produce a gaseous stream comprising $SO_2$, and removing the $SO_2$ from the gaseous stream by contacting said gaseous stream with an alkaline solution; concurrently contacting the second $H_2S$-containing stream with an aqueous solution of ferric chelate in an aqueous liquid oxidation zone under conditions to convert $H_2S$ in said second $H_2S$-containing stream to sulfur in said solution, producing a purified residual gas stream, and removing sulfur from said aqueous liquid oxidation zone. Alternately, in a further embodiment, the steam containing the minor amount of $H_2S$ is condensed and the ferric chelate solution is combined with the condensate to remove dissolved $H_2S$, the bulk of the $H_2S$ in the steam being partitioned as a non-condensible gas stream and treated as heretofore described. In preferred and more specific embodiments, the $SO_2$ produced in the thermal oxidation zone is removed by scrubbing with an alkaline solution in a scrubbing zone under conditions to produce a scrubbing zone solution containing bisulfite and/or sulfite ions, and scrubbing zone solution is combined with sulfur from the aqueous liquid oxidation zone in a blending zone under conditions to react and produce a solution containing thiosulfate ion and residual bisulfite and/or sulfite ions. In a further preferred aspect, aqueous iron chelate solution containing ferrous chelate and sulfur is removed from the condensation zone and combined with solution containing thiosulfate and residual bisulfite and/or sulfite ions from the blending zone. And in a most preferred embodiment, the $H_2S$ content of the first $H_2S$-containing stream is greater than the total amount of $H_2S$ removed in the condensation zone and from the second $H_2S$-containing stream, so that blending the wet process' sulfur with the bisulfite and/or sulfite containing stream allows total removal of derivative sulfur from the system.

DETAILED DESCRIPTION OF THE INVENTION

As indicated, the invention is suitable for the processing of a variety of gas streams containing $H_2S$. The particular type of non-condensible stream treated according to the first embodiment mentioned is not critical, the term "non-condensible" being understood herein in the sense that the gas or components thereof will not condense to any significant extent under the conditions extant in the $H_2S$ incineration zone or aqueous ferric chelate oxidation zone. Accordingly, such streams may contain a wide variety of "condensible" components, such as propane, butane, etc., and may be saturated. As will be evident to those skilled in the art, practically speaking, the only requirements are that the $H_2S$-comprising gas treated will be, other than the $H_2S$, non-reactive or substantially non-reactive with and of limited solubility (i.e., insoluble or substantially insoluble) in the aqueous ferric chelate solution. Suitable gas streams include naturally-occurring gases, fuel gases, vent gases, hydrocarbon gases, stack gases, and gases produced, for example, after the condensation of a desired component such as a hydrocarbon or steam. Other gases to which the invention may be applied are described more fully in U.S. Pat. No. 4,705,676, and, given the teachings herein, may readily be selected by those skilled in the art. The concentrations of $H_2S$ in the streams treated may vary from trace or minimal to heavy, but, not by way of limitation herein, commonly encountered streams range from 200 ppm by volume to 50 percent by volume, preferably from 0.5 percent by volume to 10 percent by volume.

Normally, the $H_2S$-contaminated steam treated according to preferred aspects of the invention will contain minor concentrations or amounts of $H_2S$ and other non-condensible gases. The source of such steam is a matter of choice, but the invention is particularly suited to the treatment of exhaust steam from turbines utilizing geothermal steam as the working fluid. In general, steam processed according to the invention will contain $H_2S$ and other non-condensible fluids in quite minor amounts, i.e., less than about 15 percent by weight. Normally, the $H_2S$ will be present in an amount of less than about 5 or 6 percent by weight, most commonly less than about 3 percent by weight. Conditions of temperature and pressure and their relationship for condensing the steam are well understood by those skilled in the art, and need not be recited herein.

The volume or concentration of $H_2S$ removed in the condensation zone, i.e., the $H_2S$ that does not remain as a non-condensible, varies considerably depending on the type of condensation employed and possibly to some extent on the pH of the oxidizing iron chelate solution. If direct contact of the chelate solution with the steam and condensate is employed, the amount of $H_2S$ removed corresponds substantially to that which dissolves in the condensate and aqueous iron chelate solution supplied. If indirect condensation of the steam is accomplished, whether with the chelate solution used as the heat exchange fluid, or with some other coolant (or both), the amount of $H_2S$ removed is that which absorbs in or is dissolved in the condensate. In the first case, the amount absorbed is further a function of several variables, including the pressure and temperature of the zone, the volume and temperature of the aqueous chelate solution supplied, and the pH of the liquid phase in the zone. In the second instance, as indicated, only the variables pertinent to the condensation of the steam matter, and less volume of liquid is present for $H_2S$ dissolution. Generally, pH of the iron chelate solution supplied to the condensation zone will range from about 4 or 4.5 to about 10, preferably from about 7 to about 10. Those skilled in the art can adjust the conditions and equipment in the condensation zone to achieve the desired partition of $H_2S$ between the liquid and non-condensible gas, as illustrated, for example, by the separation described in U.S. Pat. No. 4,468,929. According to the invention, the partition of the $H_2S$ to or as a non-condensible stream will be greater than fifty percent, i.e., the bulk of the $H_2S$ in the steam, preferably from about 75 percent to about 95 percent, by weight. This provides a non-condensible gas stream to $H_2S$ removal which corresponds to that described in relation to the first embodiment mentioned.

As stated, supra, the non-condensible gas or stream from the condensation zone is separated or divided into first and second streams which are treated separately. Generally, the non-condensible stream will be partitioned so that from 50 to 95 percent by volume, preferably from 60 to 90 percent by volume, of the stream goes to the thermal oxidation zone, the balance going to the aqueous iron chelate liquid oxidation zone. In the various embodiments of the invention where derivatives of the contaminant $H_2S$, produced in the oxidation step or steps, are utilized for production of safely disposable material, it is important that the volume of $H_2S$ sent to the thermal oxidation step be partitioned appropriately. Thus, in the first-mentioned embodiment of the invention, if complete elimination of the sulfur produced in the aqueous ferric chelate oxidation step is desired, the volume partitioned to the thermal oxidation step must be greater than 50 percent of the volume of $H_2S$ in the stream to the aqueous liquid oxidation zone. In the case where elimination of sulfur in steam condensate is desired, the volume partitioned to the thermal oxidation step must be greater than 50 percent of the total volume of $H_2S$ in the steam treated.

The specific details of the thermal oxidation step and the aqueous iron chelate oxidation procedure utilized with respect to the second portion are not per se a part of the invention. So long as the procedures accomplish, in the first instance, substantially complete conversion of the $H_2S$ to produce $SO_2$, and, in the second instance, a substantially pure vent or product gas and solid sulfur which may be removed from solution, any suitable procedures of these types may be employed. The aqueous iron chelate liquid oxidation procedure is understood to be a cyclic procedure carried out in an aqueous liquid oxidation zone, such zone including provision for regeneration of the ferrous chelate, with appropriate removal of sulfur formed from a suitable locus in the aqueous liquid oxidation zone. For example, the procedures employed in U.S. Pat. No. 4,830,838 and U.S. Pat. No. 4,774,071 may be used. The general reaction for the thermal oxidation may be shown as follows:

$$2H_2S + 3O_2 \rightarrow 2SO_2 + 2H_2O$$

Merely by way of example, temperatures in the thermal reaction zone may range from 1200° F. to 2500° F., preferably 1400° F. to 2000° F.

In the condensation zone and in the aqueous liquid oxidation zone, the reactions for conversion of the $H_2S$ by the ferric chelate and regeneration of the chelate may be summarized, as follows:

$$2Fe^{+3}\text{chelate} + H_2S \xrightarrow{\text{water}} 2Fe^{+2}\text{chelate} + S° + 2H^+$$

and $$2Fe^{+2}\text{chelate} + 2H^+ + \tfrac{1}{2}O_2 \longrightarrow 2Fe^{+3}\text{chelate} + H_2O.$$

Any suitable iron chelate system may be employed. The preferred iron chelates are coordination complexes in which the iron forms chelates by reaction with an amino carboxylic acid, a amino polycarboxylic acid, a polyamino carboxylic acid, or a polyamino polycarboxylic acid. One preferred class of coordination complexes is that in which the iron forms a chelate with an acid having the formula:

$$(A)_{3-n}\text{- - -N- -}B_n$$

wherein n is two or three, A is a lower alkyl or hydroxyalkyl group; and B is a lower alkyl carboxylic acid group.

A second class of preferred acids utilized in forming the iron chelates employed are acids having the formula $$\begin{array}{c} X \\ \diagdown \\ \end{array} \begin{array}{c} \\ \\ \end{array} \begin{array}{c} X \\ \diagup \\ \end{array}$$
$$N-R-N$$
$$\begin{array}{c} \diagup \\ X \end{array} \begin{array}{c} \\ \\ \end{array} \begin{array}{c} \diagdown \\ X \end{array}$$

wherein from two to four of the X groups are selected from lower alkyl carboxylic acid groups, zero to two of the X groups are selected from the group consisting of lower alkyl groups, lower hydroxyalkyl groups, and wherein Y is selected from lower alkyl carboxylic acid groups, and R is a divalent organic group containing 2 through 8 carbon atoms, preferably 2 through 6 carbon atoms. Representative divalent organic groups include ethylene, propylene or isopropylene, or, alternatively, cyclohexane or benzene where the two hydrogen atoms replaced by nitrogen are in the 1,2 position. The iron chelates are present in solution as solubilized species, for example, solubilized ammonium or alkali metal salts (or mixtures thereof) of the iron chelates. Accordingly, as used herein, the term "chelate" is understood herein to include mixtures of the aforementioned chelates, and references to "iron chelate" or "$Fe^{+++}$chelate", etc., in solution indicate dissolved iron chelates, whether as a salt or salts of the aforementioned cation or cations, or in some other form, in which the iron chelate or chelates exist in solution.

The iron chelates useful in the invention are readily formed in aqueous solution by reaction of an appropriate salt, oxide, or hydroxide of iron and the amino carboxylic acid present in the acid form or as an alkali or ammonium salt thereof. Exemplary aminocarboxylic acids include (1) aminoacetic acids derived from ammonia or 2-hydroxyalkyl amines, such as glycine, diglycine; 2-hydroxyalkyl glycine, dihydroxyalkyl glycine, and (2) nitrilotriacetic acid; and (3) aminoacetic acids derived from ethylene diamine, diethylene triamine, 1,2-propylene diamine, and 1,3-propylene diamine, such as ethylenediamine tetracetic acid, 2-hydroxyethyl ethylenediamine triacetic acid, and diethylenetriamine pentaacetic acid; and (4) aminoacetic acids derived from cyclic 1,2 diamines, such as 1,2-diamino cyclohexane N,N-tetraacetic acid, and 1,2-phenylenediamine-N,N-tetraacetic acid. The iron chelates of 2-hydroxyethyl ethylenediamine triacetic acid and nitrilotriacetic acid are preferred. The ferric chelate solutions will be supplied respectively to the condensation zone and the aqueous liquid oxidation zone in effective amounts, i.e., at least an amount sufficient to each, on a stoichiometric basis, to convert the $H_2S$ removed or present in the stream treated.

Suitable conditions, proportions, and parameters for the iron chelate removal of $H_2S$ are well described in the patent literature, especially U.S. Pat. No. 4,705,676, and per se form no part of the present invention.

An important advantage of the apportionment of the $H_2S$-containing stream to an iron chelate liquid oxidation zone is the reduction of the volume or amount of $SO_2$ formed, and, accordingly, the volume of non-recoverable alkaline solution required for $SO_2$ conversion. As used herein, the term "alkaline solution" is understood to refer to an aqueous solution of an ammonium or alkali metal hydroxide or hydroxides, and mixtures thereof, and such solutions will preferably contain from 1 percent to 50 percent by weight of the dissolved hydroxide or hydroxides, most preferably from 10 percent to 25 percent by weight. According to the invention, the alkaline solution is supplied with the alkali metal or ammonium ion in stoichiometric equivalent or excess with respect to the $SO_2$ in the gas from the thermal oxidation zone. Conditions may be regulated to convert the $SO_2$ to bisulfite according to the general reaction:

$$2\ MeOH + 2\ SO_2 \rightarrow 2\ MeHSO_3$$

wherein Me is alkali metal or ammonium. With stoichiometric excess, sulfite is also formed, according to the reaction:

$$2\ MeOH + SO_2 \rightarrow Me_2SO_3 + H_2O$$

wherein Me is also alkali metal or ammonium. A large excess provides almost, if not all, sulfite. A relatively dilute solution of alkali metal or ammonium bisulfite and/or sulfite is produced which is readily used or disposed of. However, as noted previously, in one of the unique and preferred aspects of the invention, the aqueous solution containing bisulfite and/or sulfite ions is removed from the $SO_2$ contact or scrubbing zone and combined or mixed with sulfur removed from the aqueous iron chelate liquid oxidation zone. This combination may suitably be carried out at the temperatures and pressures prevailing, e.g., 70° F. to 160° F., and atmospheric pressure to 5 atmospheres or more. If the pH in the combined mixture is maintained at a suitable range, e.g., 4.5 to 10, by addition of alkaline solution, if necessary, the sulfur will be converted to thiosulfate ion, as follows:

$$S° + HSO_3^- \rightarrow S_2O_3^{-2} + H^+$$

or $$S° + SO_3^{-2} \rightarrow S_2O_3^{-2}$$

The resulting solution will be a thiosulfate-containing solution still containing bisulfite and/or sulfite. If this solution is then combined, in the embodiments mentioned, with sulfur-containing condensate from the condensation-$H_2S$-removal zone, under similar conditions, i.e., 70° F. to 160° F., and atmospheric pressure to 5 atmospheres, the resulting further reaction will substantially reduce or totally eliminate derivative sulfur from the system. Additionally, as discussed more fully hereinafter, the solution may also provide a source of chelated iron for the condensation zone reaction.

The following illustrations are given for a fuller understanding of the invention. All values are calculated or exemplary. Accordingly, in FIG. 1, an $H_2S$-containing gas, e.g., a sour vent gas containing about 1 percent of $H_2S$ and 99 percent or so of other non-condensible gases, both percentages by weight, in line 1 is shown partitioned at A so that a volume of gas comprising 60 percent by weight of the $H_2S$ in the gas goes via line 2 to thermal oxidizer 3, while the balance is sent through line 4. In thermal oxidizer 3, the $H_2S$ is oxidized with air at, for example, 1600° F., as described previously, to produce in line 5 a gas stream comprising $SO_2$ and remaining non-condensibles. The $SO_2$-containing stream is contacted or scrubbed in zone 6, which comprises, for example, a conventional scrubber, with a stoichiometric excess (1.5 to 1) of a 25 percent by weight solution of aqueous NaOH supplied via line 7. As more fully described in U.S. Pat. No. 4,834,959, the scrubbing produces, under suitable conditions, a dilute solution containing principally bisulfite ion and sulfite ion, the solution being removed from zone 6 via line 8. Remaining non-condensibles exit via line 9.

Figure 1:
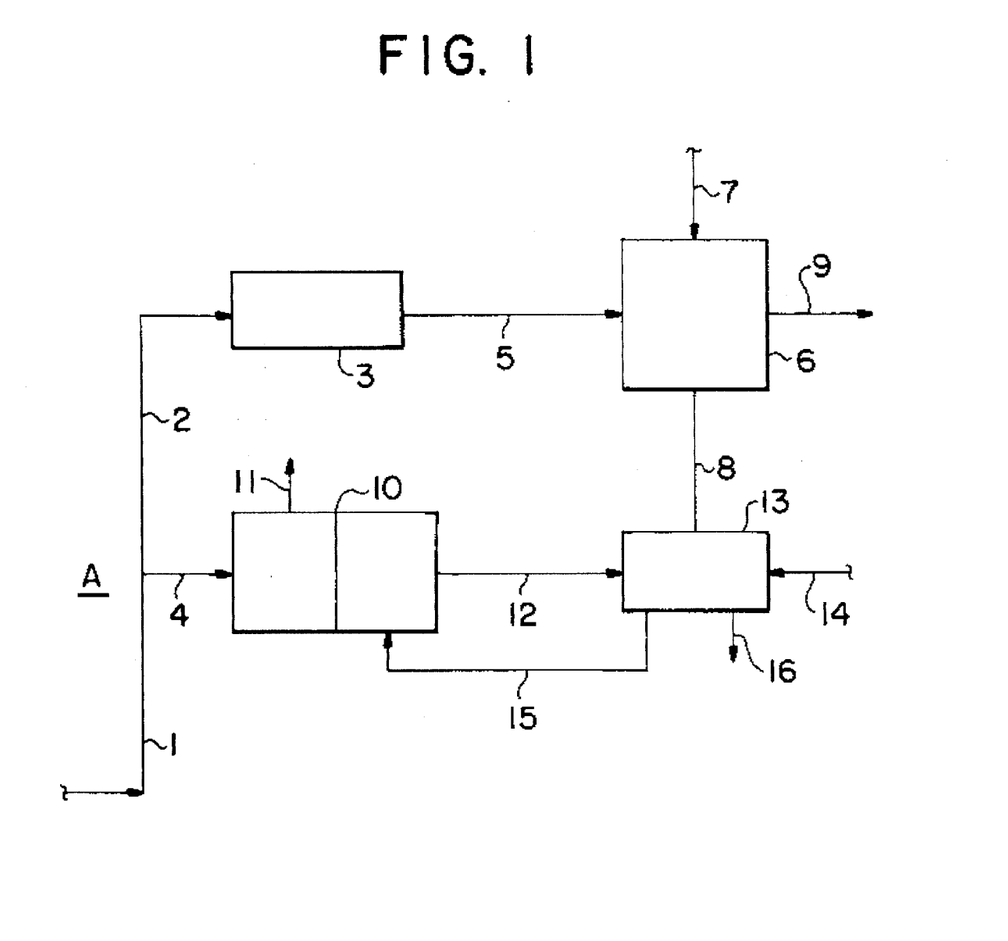
FIG. 1 illustrates schematically an embodiment of the invention wherein alkaline solution from an $SO_2$ scrubbing step, containing bisulfite ion and/or sulfite ion, is blended with sulfur produced in an aqueous liquid oxidation zone by the aqueous ferric chelate oxidation of $H_2S$ in a partitioned non-condensible gas.

Concurrently, the $H_2S$-containing stream in line 4 enters aqueous liquid oxidation zone 10 where it is contacted with a stoichiometric excess of an aqueous solution containing 0.8M sodium ferric chelate of N-(2-hydroxyethyl) ethylenediamine triacetate chelate. As indicated, other preferred ferric chelate solutions, of similar chelate concentrations, such as those containing sodium or ammonium nitrilotriacetate chelate or sodium ethylenediamine tetraacetate chelate, may be used. The $H_2S$ is converted in the manner known to those skilled in the art, as illustrated in the aforementioned patents. A purified vent stream of remaining non-condensibles is removed via line 11, and sulfur is shown as removed from the aqueous liquid oxidation zone in line 12. Provision is made for regeneration and recycle of the solubilized iron chelate in the system or zone (not shown).

The diluted scrubbing liquid in line 8, containing bisulfite and sulfite ions, is sent to blending zone or tank 13, which is maintained at atmospheric pressure, the temperature in the tank stabilizing in a range of from about 70° F. to about 190° F. Sulfur from line 12 is combined or blended in zone or tank 13 with the dilute bisulfite/sulfite solution. As discussed more fully hereinafter, the sulfur from 12 contains some iron chelate residue. In tank 13, the sulfur reacts with the bisulfite/sulfite ions to form thiosulfate, effectively solubilizing all the sulfur from zone 10. Alkaline solution may be provided via line 14 to maintain proper pH, which generally should be held between 4.5 and 10. By so doing, separate disposal of the sulfur from the aqueous iron chelate oxidation zone is avoided. The iron chelate residue values are recovered in the blend solution, and if desired, blend solution with thiosulfate may be returned to the aqueous liquid oxidation zone 10 by line 15, or may be used or disposed of in other fashion (line 16).

Figure 2:
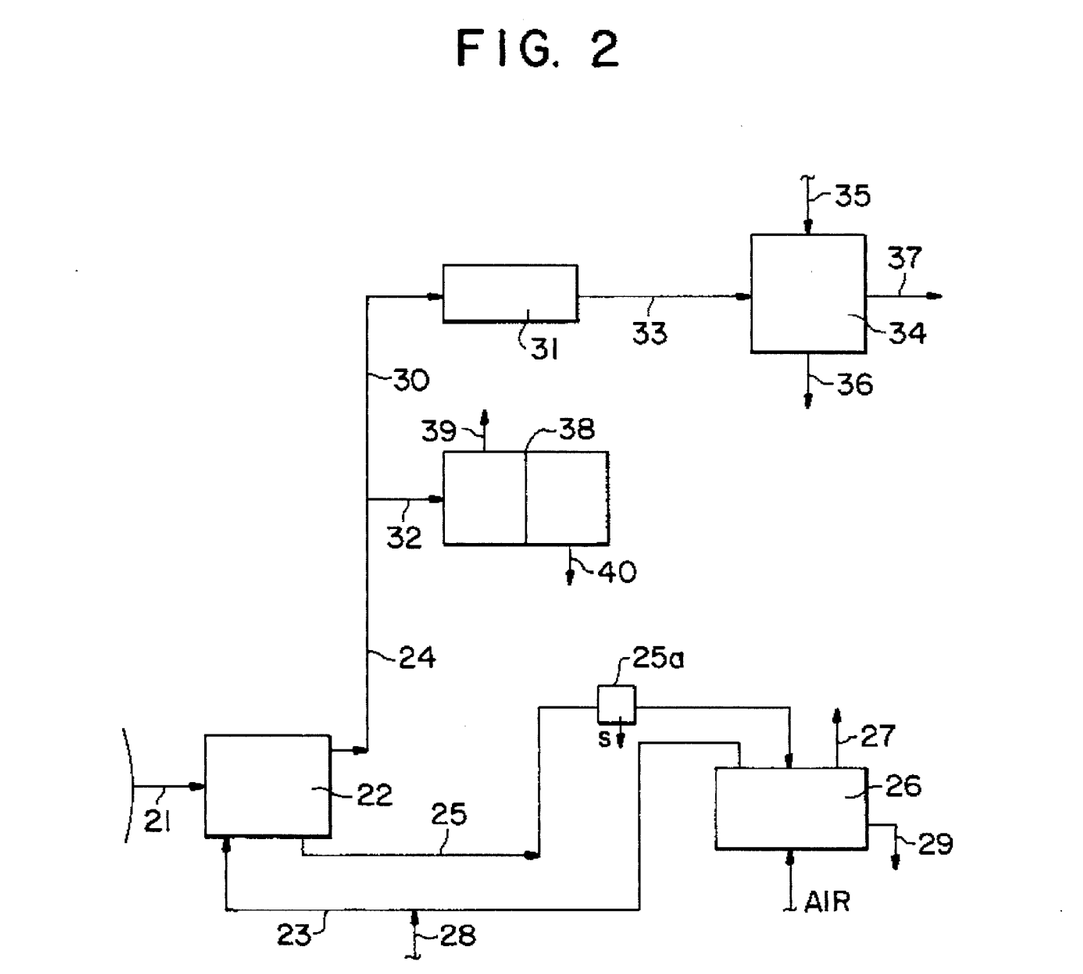
FIG. 2 illustrates schematically an embodiment of the invention in which turbine exhaust steam containing $H_2S$ is treated by condensation and partial $H_2S$ removal in a combination condensation and aqueous solution oxidation zone, undissolved or unreacted $H_2S$ passing from the zone with other non-condensible gases and being partitioned or separated into primary and secondary portions which are oxidized by specified oxidation procedures.

In FIG. 2, an $H_2S$-containing steam, e.g., geothermal steam containing about 1 percent of $H_2S$ and about 9 percent or so of other non-condensible gases, both percentages by weight, exhausts from a turbine through line 21 to a direct contact condensation zone or condenser 22. Condenser 22 may comprise a single large spray tower, or may comprise multiple condensation zones, as described, for example, in U.S. Pat. No. 4,468,929. From line 23, cooling water or solution containing sodium ferric chelate of N-(2-hydroxyethyl) ethylenediamine triacetate chelate, in a concentration of about 1 percent by weight and at a pH of about 8, is sprayed into condenser 22 to condense the steam and convert $H_2S$ in or from the steam to sulfur. Concurrently, the ferric chelate is converted by the $H_2S$ conversion reaction to ferrous chelate. Approximately 95 percent by weight of the $H_2S$ in the steam, along with other non-condensible gases, such as $N_2$, $CO_2$, and $O_2$, is removed from the condensation zone 22 in line 24. Aqueous solution or liquid, which comprises a mixture of condensate, ferric and ferrous chelate of the aforementioned acid, residual dissolved $H_2S$, and sulfur is removed via line 25, and is sent to cooling tower 26. To prevent any buildup of sulfur in the system, sulfur may be removed from the liquid before or after the cooling tower, preferably before the tower, a settling basin arrangement being provided as indicated at 25a. In cooling tower 26, oxygen (as air) is blown through the solution to oxidize ferrous chelate therein to ferric chelate, spent air exiting at 27. In order to prevent the release of any unreacted dissolved $H_2S$ in the liquid sent to tower 26, an amount of ferric chelate is added to the circulating solution at 28 to maintain a concentration of ferric chelate in the solution which greater than that required to convert the removed $H_2S$ in zone 22. In this manner, any remaining dissolved $H_2S$ is effectively oxidized before the condensate/chelate solution enters the top of cooling tower 26. The air flow and time of contact between the air and solution in tower 26 is sufficiently long that the ferrous chelate which results from the oxidation of hydrogen sulfide is reoxidized to the active ferric state as it passes down cooling tower 26. Line 23 provides return of solution to condensation zone 22, while exit line 29 is provided for blowdown of the solution, e.g., to an injection well. The amount of fresh chelate solution added at 28 is further regulated or increased to compensate for any iron chelate lost at 29.

The volume of $H_2S$ and other non-condensible gases in line 24 is partitioned, so that a volume of gas comprising 60 percent of the $H_2S$ in the geothermal steam goes via line 30 to thermal oxidizer 31, while the balance is sent through line 32. In thermal oxidizer 31, the $H_2S$ is oxidized with air at, for example, 1600° F., as described previously, to produce in line 33 a gas stream comprising $SO_2$ and remaining non-condensibles. The $SO_2$-containing stream is contacted or scrubbed in zone 34, which comprises, for example, a conventional scrubber, with stoichiometric excess of a 25 percent by weight solution of aqueous NaOH supplied via line 35. As more fully described in U.S. Pat. No. 4,834,959, the scrubbing produces, under suitable conditions, a dilute solution containing principally bisulfite ion and sulfite ion, the solution being removed from zone 34 via line 36. This dilute stream of bisulfite and sulfite is easily disposed of, if desired. Remaining non-condensibles exit via line 37.

Similar to the previous example, the $H_2S$-containing stream in line 32 enters contacting zone 38 where it is contacted with a stoichiometric excess of an aqueous solution containing 0.8M sodium ferric chelate of N-(2-hydroxyethyl) ethylenediamine triacetate chelate. As indicated, other preferred ferric chelate solutions, of similar chelate concentrations, such as those containing sodium or ammonium nitrilotriacetate chelate or sodium ethylenediamine tetraacetate chelate, may be used. The $H_2S$ is converted in the manner known to those skilled in the art, and a purified vent stream of remaining non-condensibles is removed via line 39, sulfur being removed at 40. Provision is made for regeneration and recycle of the solubilized iron chelate in the system (not shown).

Figure 3:
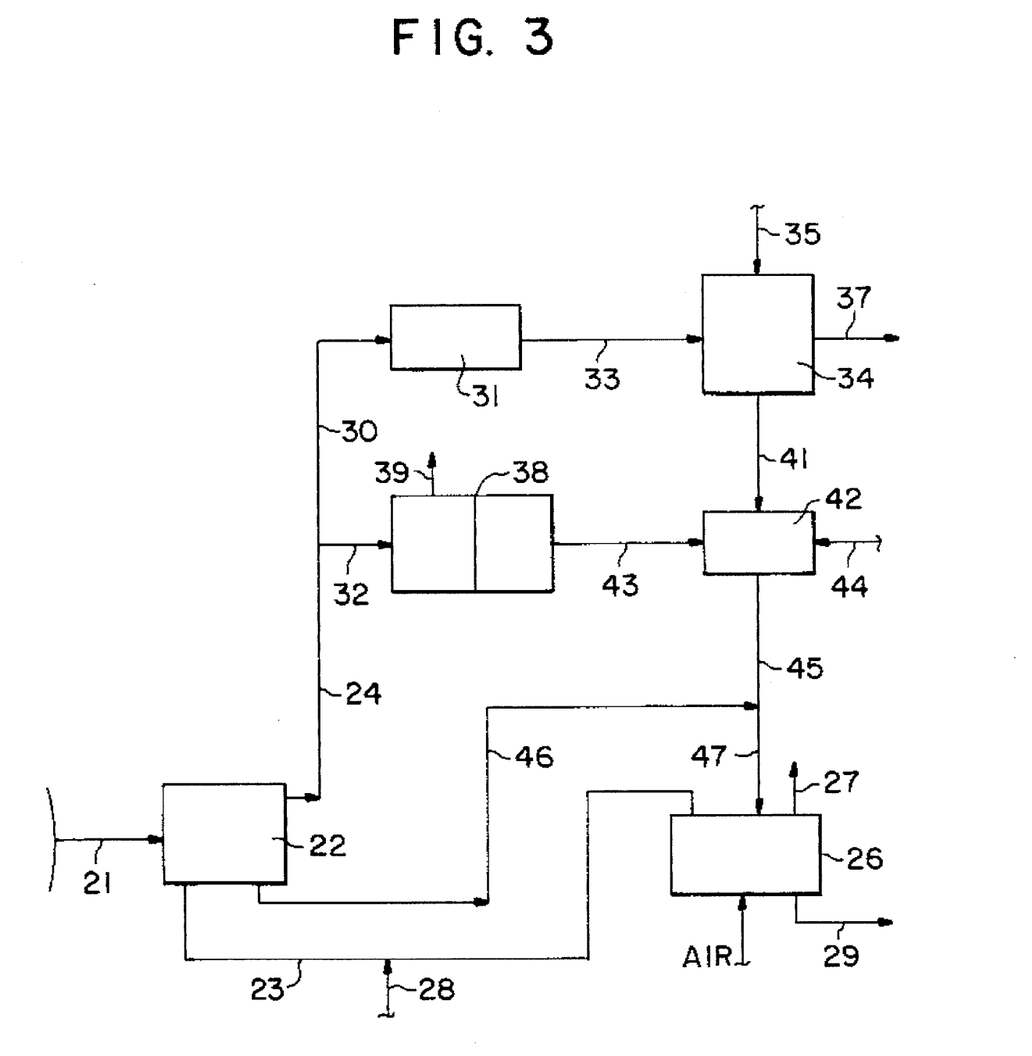
FIG. 3 illustrates schematically a very preferred embodiment of the invention wherein alkaline solution from an $SO_2$ removal step, containing bisulfite ion and/or sulfite ion, is blended with sulfur produced by the aqueous ferric chelate oxidation of $H_2S$ in the secondary portion in the aqueous liquid oxidation zone, and the mixture formed is further blended with the sulfur-containing condensate-aqueous iron chelate containing liquid from the condensation zone.

With respect to FIG. 3, numerals used therein which are identical to those used in FIG. 2 correspond to the same or analogous equipment. Thus, the elements 21 to 24, 26 through 35, and 37 through 39 of FIG. 3 correspond to the same features in FIG. 2. However, the unique integration of components and process streams shown in FIG. 3 provides important advantages and results.

More particularly, similar to the procedure of FIG. 1, diluted scrubbing liquid in line 41, containing bisulfite ion (and some sulfite ion) is sent to blending zone or tank 42, which is maintained at atmospheric pressure, the temperature in the tank stabilizing in a range of from about 70° F. to about 190° F. Concurrently, sulfur is removed from the aqueous iron chelate liquid oxidation zone 38 via line 43. The sulfur is then combined or blended in zone or tank 42 with the dilute bisulfite/sulfite solution. As discussed more fully hereinafter, the sulfur from 38 contains some iron chelate residue. In tank 42, the sulfur reacts with the bisulfite and sulfite to form thiosulfate, effecttively solubilizing all the sulfur from zone 38. Alkaline solution may be provided via line 44 to maintain proper pH, which generally should be held between 4.5 and 10. By so doing, separate disposal of the sulfur from the aqueous iron chelate oxidation zone is avoided, and the iron chelate residue values are recovered in the blend solution. Further according to the invention, blend solution containing excess bisulfite, sulfite, and thiosulfate, is removed from tank 42 via line 45. This stream is combined, as shown, with liquid in line 46, which comprises sulfur-containing condensate-reactant mixture removed from condenser 2. Line 46 may or may not comprise a basin (not shown) with the function of element 25a. Sulfur and hydrosulfide in the condensate-reactant mixture are converted by the excess bisulfite and sulfite in line 45 to form thiosulfate. If a stoichiometric excess of bisulfite/sulfite is present (enabled by proper partitioning of the $H_2S$ to the thermal oxidizer), all of the sulfur produced in the wet oxidation procedures may be converted. The combined liquid is forwarded via line 47 to cooling tower 26, where it may be treated in the manner described previously with respect to that from line 25. As noted above, the iron chelate values remaining in the sulfur from zone 38 are captured, and may be used in the condenser reactant liquid, so that makeup requirements of $Fe^{+3}$ chelate to the condenser reactant liquid in line 3 will be reduced or eliminated. Optionally, if close stoichiometric control is maintained, the alkaline solution in line 16 may be partitioned or split (not shown) between 42 and 46.

As will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which are beneficial, and other additives, such as antifoaming and/or wetting agents, may be employed.

What is claimed is:

1. A process for removing $H_2S$ from a non-condensible gas stream containing $H_2S$ and other non-condensible gases comprising dividing or partitioning said non-condensible gas stream into a first $H_2S$-containing stream containing the bulk of the $H_2S$ in said gas stream and a second $H_2S$-containing gas stream containing a minor portion of the $H_2S$ in the non-condensible gas stream; oxidizing the $H_2S$ in the first $H_2S$-containing stream in a thermal oxidation zone to produce a gaseous stream comprising $SO_2$, and removing the $SO_2$ from the gaseous stream by contacting said gaseous stream with an alkaline solution under conditions to produce a purified gas stream and a scrubbing zone solution containing bisulfite and/or sulfite ions; while simultaneously contacting the second $H_2S$-containing gas stream with an aqueous solution of ferric chelate in an aqueous liquid oxidation zone under conditions to convert $H_2S$ in said second $H_2S$-containing gas stream to sulfur in said solution, producing a purified residual gas stream, and removing sulfur from said aqueous liquid oxidation zone; and combining scrubbing zone solution containing bisulfite and/or sulfite ions with sulfur from the aqueous liquid oxidation zone in a blending zone under conditions to react sulfur and sulfite and/or bisulfite ions to produce a solution containing thiosulfate ion and residual bisulfite and/or sulfite ions.

2. The process of claim 1 wherein the ferric chelate is the chelate of an organic acid having the formula wherein n is two or three, A is a lower alkyl or hydroxyalkyl group; and B is a lower alkyl carboxylic acid group; or of an organic acid having the formula wherein from two to four of the X groups are selected from lower alkyl carboxylic acid groups, zero to two of the X groups are selected from the group consisting of lower alkyl groups, lower hydroxyalkyl groups, and wherein Y is selected from lower alkyl carboxylic acid groups, and R is a divalent organic group containing 2 through 8 carbon atoms.

3. The process of claim 1 wherein the ferric chelate is selected from the ferric chelates of 2-hydroxyethyl ethylenediamine triacetic acid, nitrilotriacetic acid, and ethylenediamine tetraacetic acid.

4. A process comprising condensing steam containing a minor amount of $H_2S$ and other non-condensible gases in a condensation zone with an aqueous solution containing a ferric chelate under conditions to convert $H_2S$ to sulfur, and ferric chelate to ferrous chelate, leaving a non-condensible gas stream containing the bulk of the $H_2S$ in the steam; dividing or partitioning said non-condensible gas stream into a first $H_2S$-containing stream containing the bulk of the $H_2S$ in said gas stream and a second $H_2S$-containing stream containing a minor portion of the $H_2S$ in the non-condensible gas stream; oxidizing the $H_2S$ in the first $H_2S$-containing stream in a thermal oxidation zone to produce a gaseous stream comprising $SO_2$, and removing the $SO_2$ from the gaseous stream by contacting said gaseous stream with an alkaline solution; while simultaneously contacting the second $H_2S$-containing stream with an aqueous solution of ferric chelate in an aqueous liquid oxidation zone under conditions to convert $H_2S$ in said second $H_2S$-containing stream to sulfur in said solution, producing a purified residual gas stream, and removing sulfur from said aqueous liquid oxidation zone.

5. The process of claim 4 wherein the $SO_2$ is removed by scrubbing in a scrubbing zone with an alkaline solution under conditions to produce a scrubbing zone solution containing bisulfite and/or sulfite ions, and scrubbing zone solution is combined with sulfur from the aqueous liquid oxidation zone in a blending zone under conditions to react sulfur and sulfite and/or bisulfite ions to produce a solution containing thiosulfate ion and residual bisulfite and/or sulfite ions.

6. The process of claim 5 wherein aqueous iron chelate solution containing ferrous chelate and sulfur is removed from the condensation zone and combined with solution containing thiosulfate and residual bisulfite and/or sulfite ions from the blending zone.

7. The process of claim 5 wherein the $H_2S$ content of the first $H_2S$-containing stream is greater than the total amount of $H_2S$ removed in the condensation zone and from the second $H_2S$-containing stream.

8. The process of claim 6 wherein the $H_2S$ content of the first $H_2S$-containing stream is greater than the total amount of $H_2S$ removed in the condensation zone and from the second $H_2S$-containing stream.

9. The process of claim 7 wherein the ferric chelate is the chelate of an organic acid having the formula wherein n is two or three, A is a lower alkyl or hydroxyalkyl group; and B is a lower alkyl carboxylic acid group; or of an organic acid having the formula wherein from two to four of the X groups are selected from lower alkyl carboxylic acid groups, zero to two of the X groups are selected from the group consisting of lower alkyl groups, lower hydroxyalkyl groups, and wherein Y is selected from lower alkyl carboxylic acid groups, and R is a divalent organic group containing 2 through 8 carbon atoms.

10. The process of claim 8 wherein the ferric chelate is the chelate of an organic acid having the formula wherein n is two or three, A is a lower alkyl or x hydroxyalkyl group; and B is a lower alkyl carboxylic acid group; or of an organic acid having the formula wherein from two to four of the X groups are selected from lower alkyl carboxylic acid groups, zero to two of the X groups are selected from the group consisting of lower alkyl groups, lower hydroxyalkyl groups, and wherein Y is selected from lower alkyl carboxylic acid groups, and R is a divalent organic group containing 2 through 8 carbon atoms.

11. A process comprising condensing steam containing a minor amount of $H_2S$ and other non-condensible gases in a condensation zone, producing condensate and a non-condensible gas stream containing the bulk of the $H_2S$ in the steam, and contacting the condensate with an aqueous solution containing a ferric chelate under conditions to convert $H_2S$ to sulfur, and ferric chelate to ferrous chelate; dividing or partitioning said non-condensible gas stream into a first $H_2S$-containing stream containing the bulk of the $H_2S$ in said gas stream and a second $H_2S$-containing stream containing a minor portion of the $H_2S$ in the non-condensible gas stream; oxidizing the $H_2S$ in the first $H_2S$-containing stream in a thermal oxidation zone to produce a gaseous stream comprising $SO_2$, and removing the $SO_2$ from the gaseous stream by contacting said gaseous stream with an alkaline solution; while simultaneously contacting the second $H_2S$-containing stream with an aqueous solution of ferric chelate in an aqueous liquid oxidation zone under conditions to convert $H_2S$ in said second $H_2S$-containing stream to sulfur in said solution, producing a purified residual gas stream, and removing sulfur from said aqueous liquid oxidation zone.

12. The process of claim 11 wherein the $SO_2$ is removed by scrubbing in a scrubbing zone with an alkaline solution under conditions to produce a scrubbing zone solution containing bisulfite and/or sulfite ions, and scrubbing zone solution is combined with sulfur from the aqueous liquid oxidation zone in a blending zone under conditions to react sulfur and sulfite and/or bisulfite ions to produce a solution containing thiosulfate ion and residual bisulfite and/or sulfite ions.

13. The process of claim 12 wherein aqueous iron chelate solution containing ferrous chelate and sulfur is removed from the condensation zone and combined with solution containing thiosulfate and residual bisulfite and/or sulfite ions from the blending zone.

14. The process of claim 12 wherein the $H_2S$ content of the first $H_2S$-containing stream is greater than the total amount of $H_2S$ removed in the condensation zone and from the second $H_2S$-containing stream.

15. The process of claim 13 wherein the $H_2S$ content of the first $H_2S$-containing stream is greater than the total amount of $H_2S$ removed in the condensation zone and from the second $H_2S$-containing stream.

16. The process of claim 14 wherein the ferric chelate is the chelate of an organic acid having the formula wherein n is two or three, A is a lower alkyl or hydroxyalkyl group; and B is a lower alkyl carboxylic acid group; or of an organic acid having the formula wherein from two to four of the X groups are selected from lower alkyl carboxylic acid groups, zero to two of the X groups are selected from the group consisting of lower alkyl groups, lower hydroxyalkyl groups, and wherein Y is selected from lower alkyl carboxylic acid groups, and R is a divalent organic group containing 2 through 8 carbon atoms.

17. The process of claim 15 wherein the ferric chelate is the chelate of an organic acid having the formula wherein n is two or three, A is a lower alkyl or hydroxyalkyl group; and B is a lower alkyl carboxylic acid group; or of an organic acid having the formula wherein from two to four of the X groups are selected from lower alkyl carboxylic acid groups, zero to two of the X groups are selected from the group consisting of lower alkyl groups, lower hydroxyalkyl groups, and wherein Y is selected from lower alkyl carboxylic acid groups, and R is a divalent organic group containing 2 through 8 carbon atoms.

18. The process of claim 12 wherein the ferric chelate is selected from the ferric chelates of 2-hydroxyethyl ethylene diamine triacetic acid, nitrilotriacetic acid, and ethylene diamine tetraacetic acid.

19. The process of claim 13 wherein the ferric chelate is selected from the ferric chelates of 2-hydroxyethyl ethylene diamine triacetic acid, nitrilotriacetic acid, and ethylene diamine tetraacetic acid.

20. The process of claim 15 wherein the ferric chelate is selected from the ferric chelates of 2-hydroxyethyl ethylene diamine triacetic acid, nitrilotriacetic acid, and ethylene diamine tetraacetic acid.

* * * * *